(12) United States Patent
Terasaki et al.

(10) Patent No.: US 6,976,101 B2
(45) Date of Patent: Dec. 13, 2005

(54) IMAGE INPUT/OUTPUT CONTROL APPARATUS AND IMAGE INPUT/OUTPUT SYSTEM

(75) Inventors: Yoshitaka Terasaki, Ebina (JP); Yasuhiro Kobuchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 297 days.

(21) Appl. No.: 09/879,189

(22) Filed: Jun. 13, 2001

(65) Prior Publication Data

US 2001/0052037 A1  Dec. 13, 2001

(30) Foreign Application Priority Data

Jun. 13, 2000 (JP) .............................. 2000-177096

(51) Int. Cl.[7] ............................................. G06F 13/12
(52) U.S. Cl. .................. 710/65; 710/2; 710/5; 710/20; 709/223
(58) Field of Search ..... 710/2, 5, 65, 20; 709/223–226

(56) References Cited

U.S. PATENT DOCUMENTS

| | | | | |
|---|---|---|---|---|
| 5,893,116 A | * | 4/1999 | Simmonds et al. | ......... 707/201 |
| 6,020,973 A | * | 2/2000 | Levine et al. | .............. 358/1.15 |
| 6,026,258 A | * | 2/2000 | Fresk et al. | .................... 399/87 |
| 6,089,765 A | * | 7/2000 | Mori | .......................... 400/61 |
| 6,181,436 B1 | * | 1/2001 | Kurachi | ..................... 358/1.15 |
| 6,249,226 B1 | * | 6/2001 | Harrison et al. | ......... 340/572.1 |
| 6,404,772 B1 | * | 6/2002 | Beach et al. | ................. 370/443 |
| 6,412,022 B1 | * | 6/2002 | Kumpf et al. | .................. 710/1 |
| 6,431,772 B1 | * | 8/2002 | Melo et al. | .................... 400/70 |
| 6,469,796 B1 | * | 10/2002 | Leiman et al. | ............. 358/1.15 |
| 6,487,189 B1 | * | 11/2002 | Eldridge et al. | ............ 370/338 |
| 6,513,073 B1 | * | 1/2003 | Kawai et al. | ................... 710/1 |
| 6,542,173 B1 | * | 4/2003 | Buckley | ..................... 715/841 |
| 6,581,098 B1 | * | 6/2003 | Kumpf | ....................... 709/227 |

* cited by examiner

Primary Examiner—Kim Huynh
Assistant Examiner—Eron Sorrell
(74) Attorney, Agent, or Firm—Oliff & Berridge, PLC

(57) ABSTRACT

In an image input/output system, an image input/output control apparatus is interposed between an image input/output apparatus and an information terminal apparatus. Data exchange is performed between a first transmitting/receiving section of the image input/output control apparatus and a transmitting/receiving section of the image input/output apparatus as well as between the second transmitting/receiving section of the image input/output control apparatus and a transmitting/receiving section of the information terminal apparatus. The first transmitting/receiving section and the second transmitting/receiving section are isolated from each other physically. Under the control of the control section of the image input/output control apparatus, data received by one of the first transmitting/receiving section and the second transmitting/receiving section is transmitted by the other. User interfaces relating to image input/output of the image input/output apparatus are provided by a user interface providing section of the image input/output control apparatus.

23 Claims, 15 Drawing Sheets

IMAGE INPUT/OUTPUT CONTROL APPARATUS AND IMAGE INPUT/OUTPUT SYSTEM

BACKGROUND OF THE INVENTION

1. Field of the Invention

The present invention relates to an image input/output system having an image input/output apparatus and an information terminal apparatus as well as to an image input/output control apparatus that is used in such an image input/output system.

2. Description of the Related Art

Information terminal apparatuses including notebook-sized personal computers and PDAs (personal digital assistants) enable editing and storage of text data, image data, etc. as well as transmission and reception of data to and from another apparatus. Further, in general, they are relatively light and hence can be carried easily. In general, such information terminal apparatuses have none of a reading function of reading an image on a document, a printing function of printing an image on a sheet, and a transmission function of transmitting an image by fax. Therefore, to perform any of image input and output operations including image reading, printing, and fax transmission, an information terminal apparatus is connected to an image input/output apparatus and the image input/output apparatus performs image input or output while data exchange is performed between the two apparatuses.

For example, to print text data or image data that is stored in the information terminal apparatus, the information terminal apparatus and the image input/output apparatus (in this case, a printer) operate as follows. The information terminal apparatus converts stored data into PDL data using a printer driver corresponding to the connected image input/output apparatus, accepts a user's input of control data relating to various conditions of printing (e.g., the number of prints, monochrome or color, and the printing density), and transmits the PDL data and the control data to the image input/output apparatus. Receiving the PDL data and the control data, the image input/output apparatus performs image printing based on those data.

However, the above conventional image input/output systems having an information terminal apparatus and an image input/output apparatus have the following problems. Whereas, in general, information terminal apparatuses can be carried easily, image input/output apparatuses are stationary and are in many cases connected to other apparatuses (e.g., a server apparatus) via a LAN. In such a case, the user of an information terminal apparatus who wants to perform information input or output needs to set addresses of the respective apparatuses with understanding of the LAN environment in connecting the information terminal apparatus to the image input/output apparatus via the LAN. As such, the connection work is difficult to the user and the systems are poor in convenience. Further, an illegal operation may be performed in such connection work and illegal access may be made to another apparatus on the LAN after a connection is established. It can be said that the above systems have security-related problems.

SUMMARY OF THE INVENTION

The present invention has been made in view of the above circumstances in the art, and provides an image input/output system that is superior in convenience and security in a case where the user of an information terminal apparatus performs image input or output using an image input/output apparatus, as well as an image input/output control apparatus that is used in such an image input/output system.

An image input/output control apparatus according to the invention includes (1) a first transmitting and receiving section for transmitting and receiving data to and from an image input/output apparatus that performs image input and output; (2) a second transmitting/receiving section for transmitting and receiving data to and from an information terminal apparatus that stores data to be handled by the image input/output apparatus in performing image input or output; and (3) a control section for causing data received by one of the first transmitting and receiving section and the second transmitting and receiving section to be transmitted from the other. An image input/output system according to the invention includes (1) an image input/output apparatus for performing image input and output; (2) an information terminal apparatus for storing data to be handled by the image input/output apparatus in performing image input or output; and (3) an image input/output control apparatus for transmitting and receiving data to and from each of the image input/output apparatus and the information terminal apparatus.

According to the invention, the image input/output control apparatus is interposed between the image input/output apparatus and the information terminal apparatus. Data exchange is performed between the first transmitting/receiving section of the image input/output control apparatus and the image input/output apparatus as well as between the second transmitting/receiving section of the image input/output control apparatus and the information terminal apparatus. The first transmitting/receiving section and the second transmitting/receiving section are isolated from each other physically. Under the control of the control section of the image input/output control apparatus, data received by one of the first transmitting/receiving section and the second transmitting/receiving section is transmitted by the other.

Therefore, even if the image input/output apparatus and the image input/output control apparatus are connected to each other via a network such as a LAN, the information terminal apparatus and the image input/output control apparatus can be connected to each other via a network that is independent of the above network and addresses specific to the independent network can be set in a fixed manner. Therefore, the user of the information terminal apparatus who wants to perform image input or output using the image input/output apparatus need not understand the LAN environment including the image input/output apparatus and the image input/output control apparatus in connecting the information terminal apparatus to the image input/output control apparatus nor set addresses of the respective apparatuses by himself.

The image input/output control apparatus of the invention may further include a user interface providing section for providing user interfaces relating to the image input and output of the image input/output apparatus. This allows a user to perform image input or output in an environment of the unified user interfaces that are provided by the user interface providing section.

The image input/output system of the invention may further include a billing apparatus for charging, in accordance with image input or output processing of the image input/output apparatus, a user who has performed image input or output using the information terminal apparatus. This makes it possible to install the image input/output apparatus and the image input/output control apparatus at places where they can be used by indefinite users. Even where only a particular user group can use those apparatuses, this enables charging of each user.

The image input/output system of the invention may be configured in such a manner that when data is exchanged between the information terminal apparatus and the image input/output apparatus, the data is transmitted after being converted into a data format suitable for a transmission destination apparatus. In this case, a user who wants to perform image input or output using the information terminal apparatus can cause the image input/output apparatus to perform image input or output without the need for paying attention to a data format that enables handling by the image input/output apparatus.

BRIEF DESCRIPTION OF THE DRAWINGS

Preferred embodiments of the present invention will be described in detail based on the following figures, wherein.

DESCRIPTION OF THE PREFERRED EMBODIMENT

Figure 1:
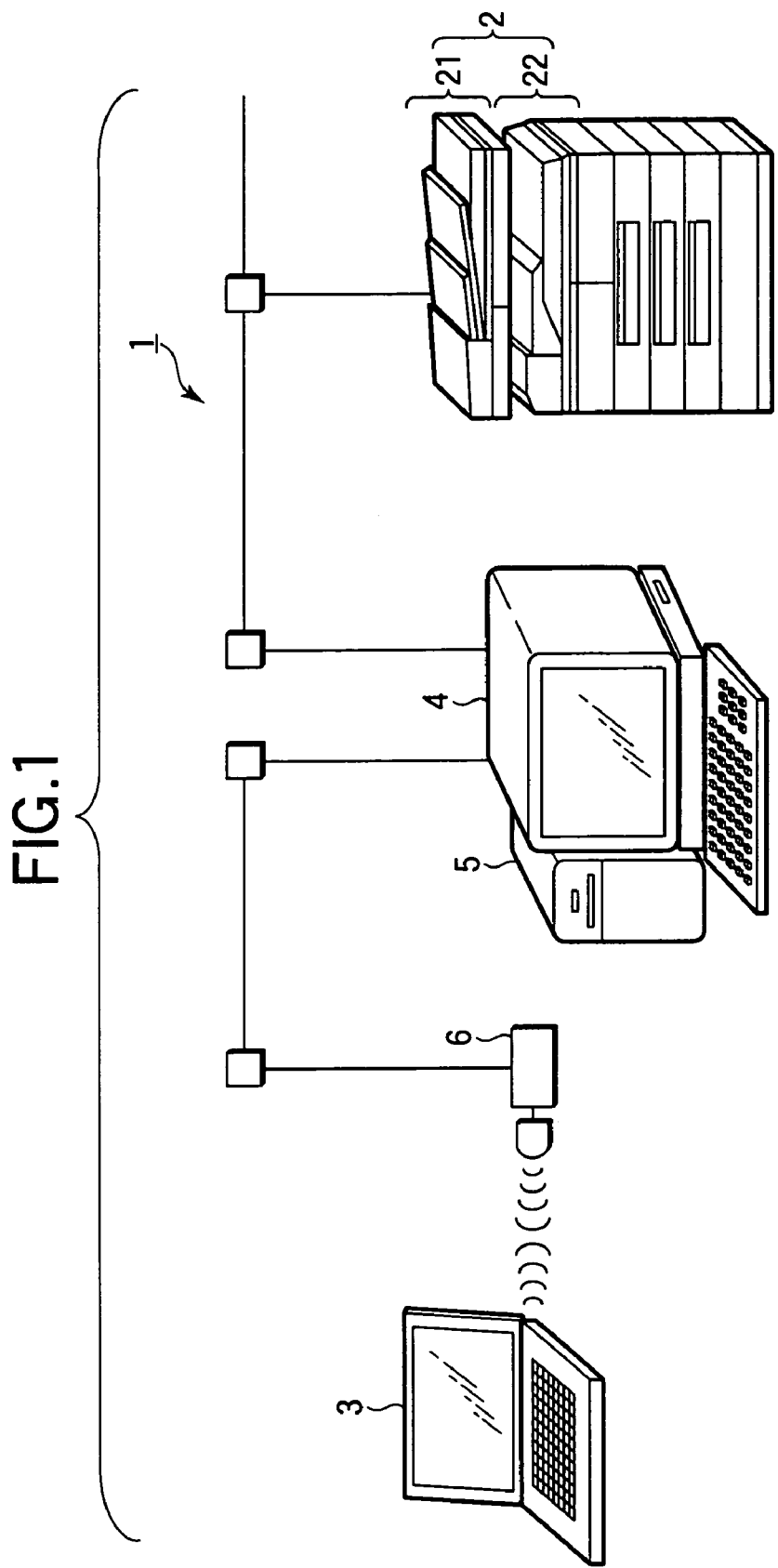
FIG. 1 schematically shows the configuration of an image input/output system 1 according to an embodiment of the present invention.

An embodiment of the present invention will be hereinafter described in detail with reference to the accompanying drawings. The same components are given the same reference symbols in the drawings and redundant descriptions will be avoided.

FIG. 1 schematically shows the configuration of an image input/output system 1 according to the embodiment. The image input/output system 1 is composed of an image input/output apparatus 2, an information terminal apparatus 3, an image input/output control apparatus 4, and a billing apparatus 5.

The image input/output apparatus 2 has an image reading section 21 for reading an image on a document and an image printing section 22 for printing an image on a sheet. Although not shown in FIG. 1, the image input/output apparatus 2 also has a fax transmitting section for transmitting an image by fax. The image input/output apparatus 2 also has a copy function of copying an image on a document onto a sheet by reading the image on the document with the image reading section 21 and printing the read image on the sheet with the image printing section 22.

The information terminal apparatus 3 has a storage section for storing text data, image data, etc. For example, text data to be stored in the storage section of the information terminal apparatus 3 is data generated on the information terminal apparatus 3 by using text generation software or data generated by another apparatus and received from it through communication or the like. For example, image data to be stored in the storage section of the information terminal apparatus 3 is data generated by photographing with a digital camera or the like and received from it through communication or the like or data generated by reading by the image reading section 21 of the image input/output apparatus 2 or another image reading device and received from it through communication or the like.

The image input/output control apparatus 4, which is connected to the image input/output apparatus 2 via a network such as a LAN, can transmit and receive data to and from the image input/output apparatus 2. The image input/output control apparatus 4, which is also connected to the information terminal apparatus 3 via a cable or by radio (e.g., using electromagnetic waves such as infrared light (IrDA), can also transmit and receive data to and from the information terminal apparatus 3. The mutual transmission/reception of data by radio is favorable to that via a cable because of easier connection work. In the image input/output system 1 shown in FIG. 1, an IrDA transceiver 6 is connected to the image input/output control apparatus 4 via a cable and data exchange according to IrDA is performed between the IrDA transceiver 6 and the IrDA transmission/reception port of the information terminal apparatus 3.

In the image input/output apparatus 4, a first transmitting/receiving section for data transmission to and reception from the image input/output apparatus 2 and a second transmitting/receiving section for data transmission to and reception from the information terminal apparatus 3 are isolated from each other physically. Therefore, data exchange between the information terminal apparatus 3 and the image input/output apparatus 2 is performed not directly but via an internal portion of the image input/output control apparatus 4. Data that is transmitted from the information terminal apparatus 3 to the image input/output apparatus 2 is data to be printed by the image printing section 22 of the image input/output apparatus 2, data to be fax-transmitted by the fax transmitting section of the image input/output apparatus 2, and control data relating to operation conditions of one of image input/output operations including image reading, printing, and fax transmission by the image input/output apparatus 2. Data that is transmitted from the image input/output apparatus 2 to the information terminal apparatus 3 is image data that is generated by reading by the image reading section 21 of the image input/output apparatus 2.

For example, the format (first format) of input/output data to be stored in the storage section of the information terminal apparatus 3 is a text data format that enables handling by text generation software or a JPEG-compressed image data format, and is different from the format (second format) of input/output data that is handled by each of the image reading section 21, the image printing section 22, and the fax transmitting section of the image input/output apparatus 2 in performing image input or output. The conversion between first-format input/output data and second-format input/output data may be performed by either the information terminal apparatus 3 or the image input/output control apparatus 4. However, in general, the data format conversion by the image input/output control apparatus 4 is preferable because the power of the CPU of the image input/output control apparatus 4 is stronger than that of the information terminal apparatus 3. In the following, it is assumed that the image input/output control apparatus 4 performs data format conversion.

Connected to the image input/output control apparatus 4, the billing apparatus 5 charges a user who has performed image input or output using the information terminal apparatus 3 in accordance with image input or output processing by the image input/output apparatus 2. A user may pay by various methods that include not only inputting of cash but also use of a prepaid card, an IC card, a credit card, or the like.

Figure 2:
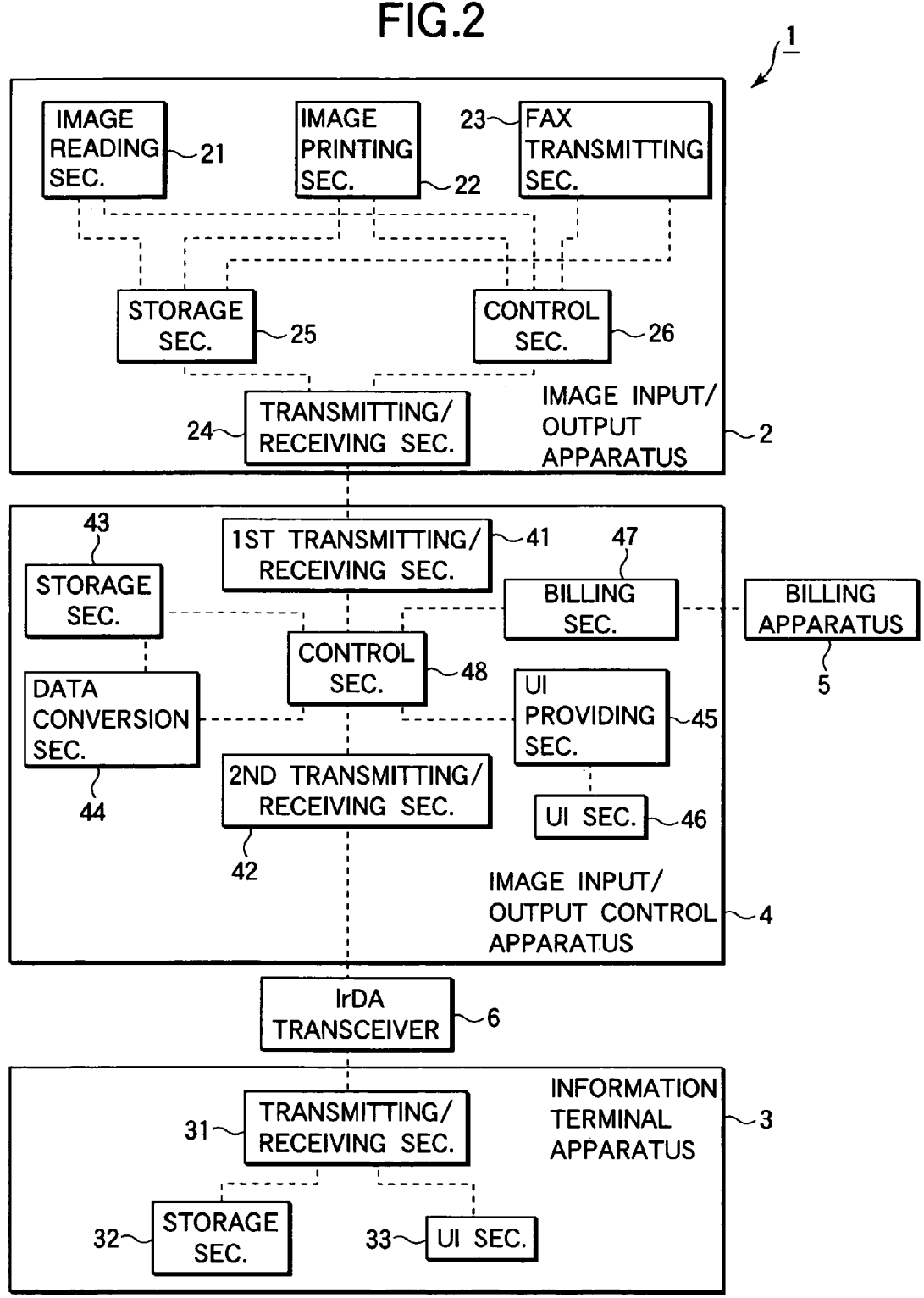
FIG. 2 is a block diagram of the image input/output system 1 according to the embodiment.

FIG. 2 is a block diagram of the image input/output system 1 according to the embodiment. As shown in FIG. 2, the image input/output apparatus 2 is composed of the image reading section 21, the image printing section 22, the fax transmitting section 23, a transmitting/receiving section 24, a storage section 25, and a control section 26. The information terminal apparatus 3 is composed of a transmitting/receiving section 31, the storage section 32, and a user interface section 33. The image input/output control apparatus 4 is composed of the first transmitting/receiving section 41, the second transmitting/receiving section 42, a storage section 43, a data conversion section 44, a user interface providing section 45, a user interface section 46, a billing section 47, and a control section 48.

Under the control of the control section 26, the image reading section 21 of the image input/output apparatus 2 reads an image on a document, generates input/output data (bitmap data) representing the image, and stores the input/output data in the storage section 25. Under the control of the control section 26, the image printing section 22 receives input/output data that is stored in the storage section 25 and prints an image on a sheet based on the input/output data. Under the control of the control section 26, the fax transmitting section 23 receives input/output data that is stored in the storage section 25 and transmits an image by fax based on the input/output data.

The transmitting/receiving section 24 of the image input/output apparatus 2 transmits and receives input/output data and control data to and from the first transmitting/receiving section 41 of the image input/output control apparatus 4. The storage section 25 of the image input/output apparatus 2 temporarily stores input/output data that will be transmitted or have been received by the transmitting/receiving section 24. The control section 26 of the image input/output apparatus 2 receives control data that is received by the transmitting/receiving section 24 and controls the operation of the image reading section 21, the image printing section 22, or the fax transmitting section 23 based on the control data.

The transmitting/receiving section 31 of the information terminal apparatus 3 transmits and receives input/output data and control data to and from the second transmitting/receiving section 42 of the image input/output control apparatus 4 via the IrDA transceiver 6. The storage section 32 of the information terminal apparatus 3 stores input/output data that will be transmitted or have been received by the transmitting/receiving section 31. The user interface section 33 of the information terminal apparatus 3 accepts the user's input of control data relating to operation conditions etc. of image input or output to be performed by the image reading section 21, the image printing section 22, or the fax transmitting section 23 of the image input/output apparatus 2. The user interface section 33, which is equipped with a display section, has a function of accepting the user's selection among displayed operation conditions etc. of image input/output, a viewer function, and a preview function.

Control data that is accepted by the user interface section 33 of the information terminal apparatus 3 include the following information. First, the control data include information indicating which of image reading, image printing, and fax transmission the user is going to perform. When image input/output (i.e., reading of an image on a document) should be performed by the image reading section 21, the control data include information relating to image reading conditions such as a resolution, a density, monochrome or color, a document size, and a file name to be used in storing read input/output data in the storage section 32. When image input/output (i.e., printing of an image on a sheet) should be performed by the image printing section 22, the control data include information relating to image printing conditions such as a resolution, a density, monochrome or color, a sheet size, the number of prints, and a file name of input/output data that is stored in the storage section 32 for printing. When image/input (i.e., transmission of an image by fax) should be performed by the fax transmitting section 23, the control data include information relating to fax transmission conditions such as a resolution, a density, a transmission destination telephone number, and a file name (in a case where input/output data stored in the storage section 32 is to be transmitted).

The first transmitting/receiving section 41 of the image input/output control apparatus 4 transmits and receives input/output data and control data to and from the transmitting/receiving section 24 of the image input/output apparatus 2. The second transmitting/receiving section 42 of the image input/output control apparatus 4 transmits and receives input/output data and control data to and from the transmitting/receiving section 31 of the information terminal apparatus 3 via the IrDA transceiver 6. The first transmitting/receiving section 41 and the second transmitting/receiving section 42 are isolated from each other physically.

The storage section 43 of the image input/output control apparatus 4 stores input/output data and control data that will be transmitted or have been received by each of the first transmitting/receiving section 41 and the second transmitting/receiving section 42. The data conversion section 44 of the image input/output control apparatus 4 performs data format conversion between first-format input/output data and second-format input/output data under the control of the control section 48. Specifically, the data conversion section 44 converts first-format input/output data that is stored in the storage section 43 into second-format input/output data and stores the latter in the storage section 43. Or the data conversion section 44 converts second-format input/output data that is stored in the storage section 43 into first-format input/output data and stores the latter in the storage section 43.

The user interface providing section 45 of the image input/output control apparatus 4 provides user interfaces relating to image input/output of the image input/output apparatus 2 to the user interface section 33 of the information terminal apparatus 3 as well as to the user interface section 46 of the self apparatus. It is preferable that the user interface providing section 45 of the image input/output control apparatus 4 be a Web server and the user interface section 33 of the information terminal apparatus 3 be a Web browser.

The billing section 47 of the image input/output control apparatus 4 calculates an amount of money to be charged in accordance with image input or output processing by the image reading section 21, the image printing section 22, or the fax transmitting section 23 of the image input/output apparatus 2 under the control of the control section 48, and informs the billing apparatus 5 of the calculated amount of money. Based on this notice, the billing apparatus 5 charges the user who has performed image input or output using the information terminal apparatus 3.

The control section 48 of the image input/output control apparatus 4 stores data that is received by the first transmitting/receiving section 41 or the second transmitting/receiving section 42 in the storage section 43, and causes the first transmitting/receiving section 41 or the second transmitting/receiving section 42 to transmit data stored in the storage section 43. Further, the control section 48 controls the operations of the data conversion section 44, the user interface providing section 45, and the billing section 47.

Next, the user interfaces that are provided by the user interface providing section 45 of the image input/output control apparatus 4 according to the embodiment will be described with reference to FIGS. 3–15. The operation of the image input/output system 1 according to the embodiment will also be described.

Figure 3:
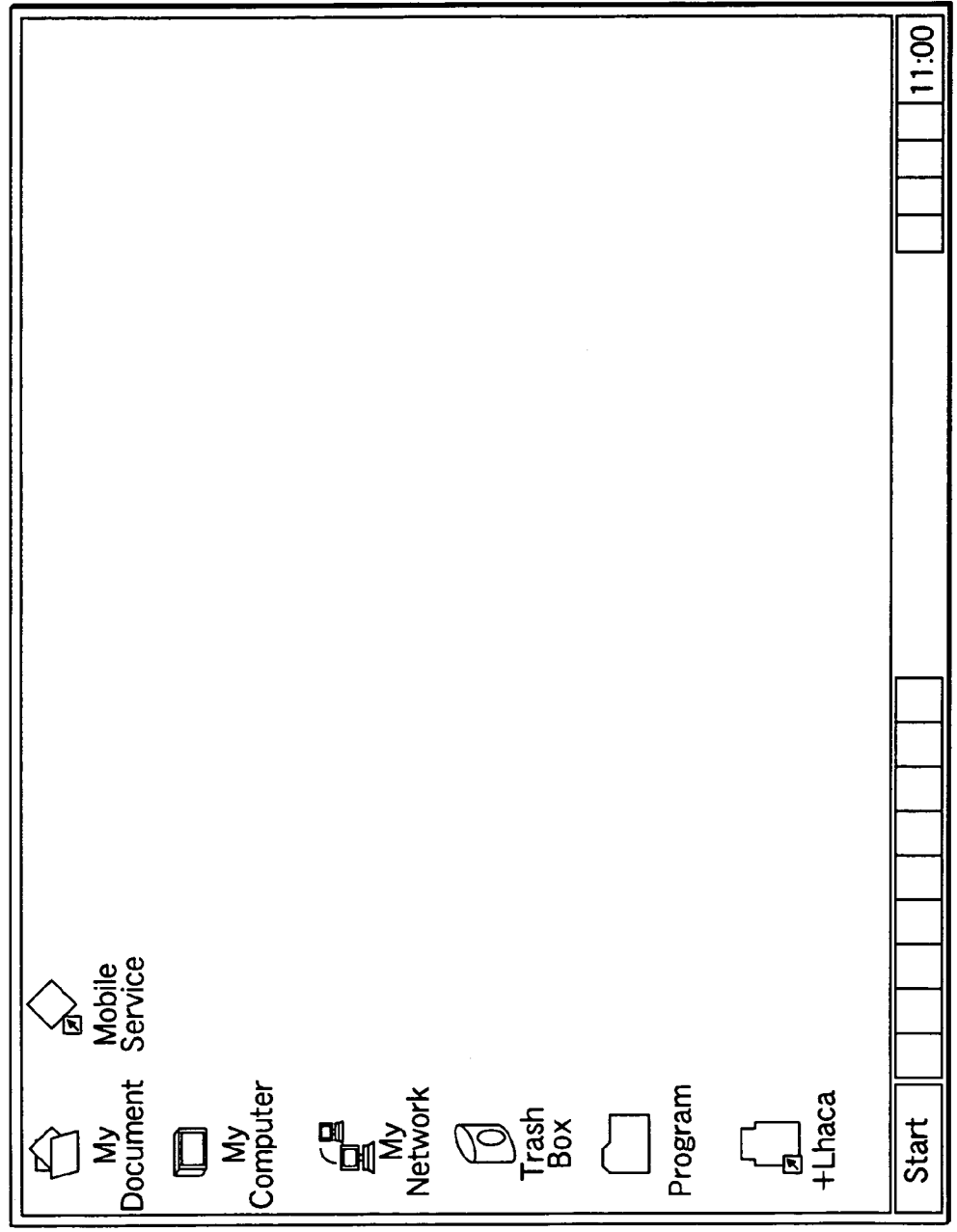
FIG. 3 shows an initial display picture of a user interface section 33 of an information terminal apparatus 3.

FIG. 3 shows an initial display picture of the user interface section 33 of the information terminal apparatus 3. An icon having words "Mobile Service" is displayed in this initial display picture (desk top picture). This icon is to activate a program for accessing the image input/output control apparatus 4 form the information terminal apparatus 3. For example, the program and icon are downloaded from the image input/output control apparatus 4, downloaded from a prescribed website over the Internet, or installed via a recording medium such as a CD-ROM or a floppy disk.

If the icon having the words "Mobile Service" on the initial display picture (FIG. 3) is double-clicked with the mouse, the program for accessing the image input/output control apparatus 4 form the information terminal apparatus 3 is activated. From this time onward, user interfaces relating to image input/output of the image input/output apparatus 2 are supplied from the user interface providing section 45 of the image input/output control apparatus 4 to the user interface section 33 of the information terminal apparatus 3 via the transmitting/receiving section 31 of the information terminal apparatus 3, the IrDA transceiver 6, and the second transmitting/receiving section 42 and the control section 48 of the image input/output control apparatus 4 and are displayed there.

Figure 4:
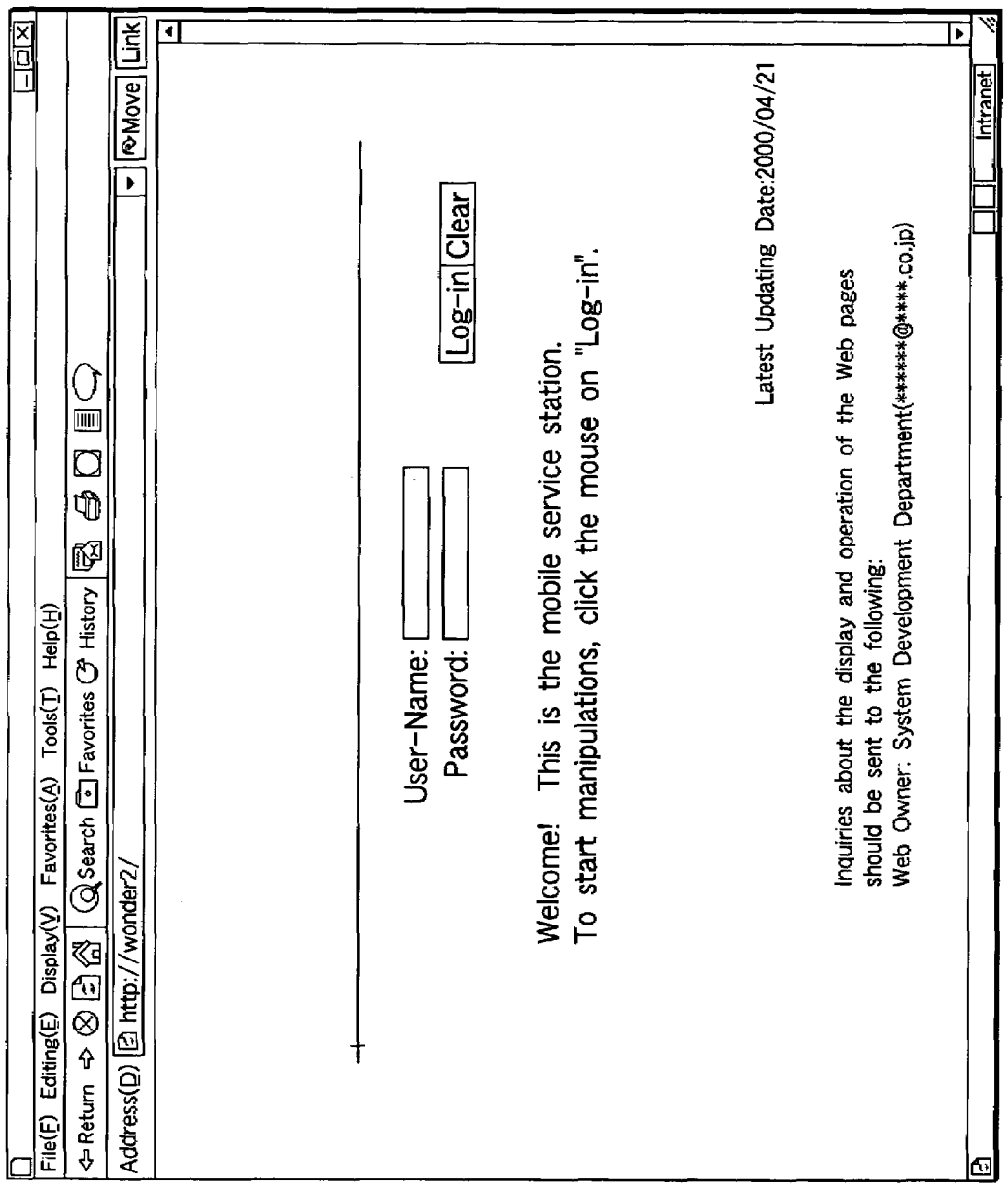
FIG. 4 shows a log-in picture of the user interface section 33 of the information terminal apparatus 3.

FIG. 4 shows a log-in picture of the user interface section 33 of the information terminal apparatus 3. If the icon having the words "Mobile Service" is double-clicked on the initial display picture (FIG. 3), the log-in picture shown in FIG. 4 is supplied from the user interface providing section 45 of the image input/output control apparatus 4 to the user interface section 33 of the information terminal apparatus 3 and is displayed there. On the log-in picture, the user key-inputs a user name and a password and clicks the mouse on "Log-in."

Figure 5:
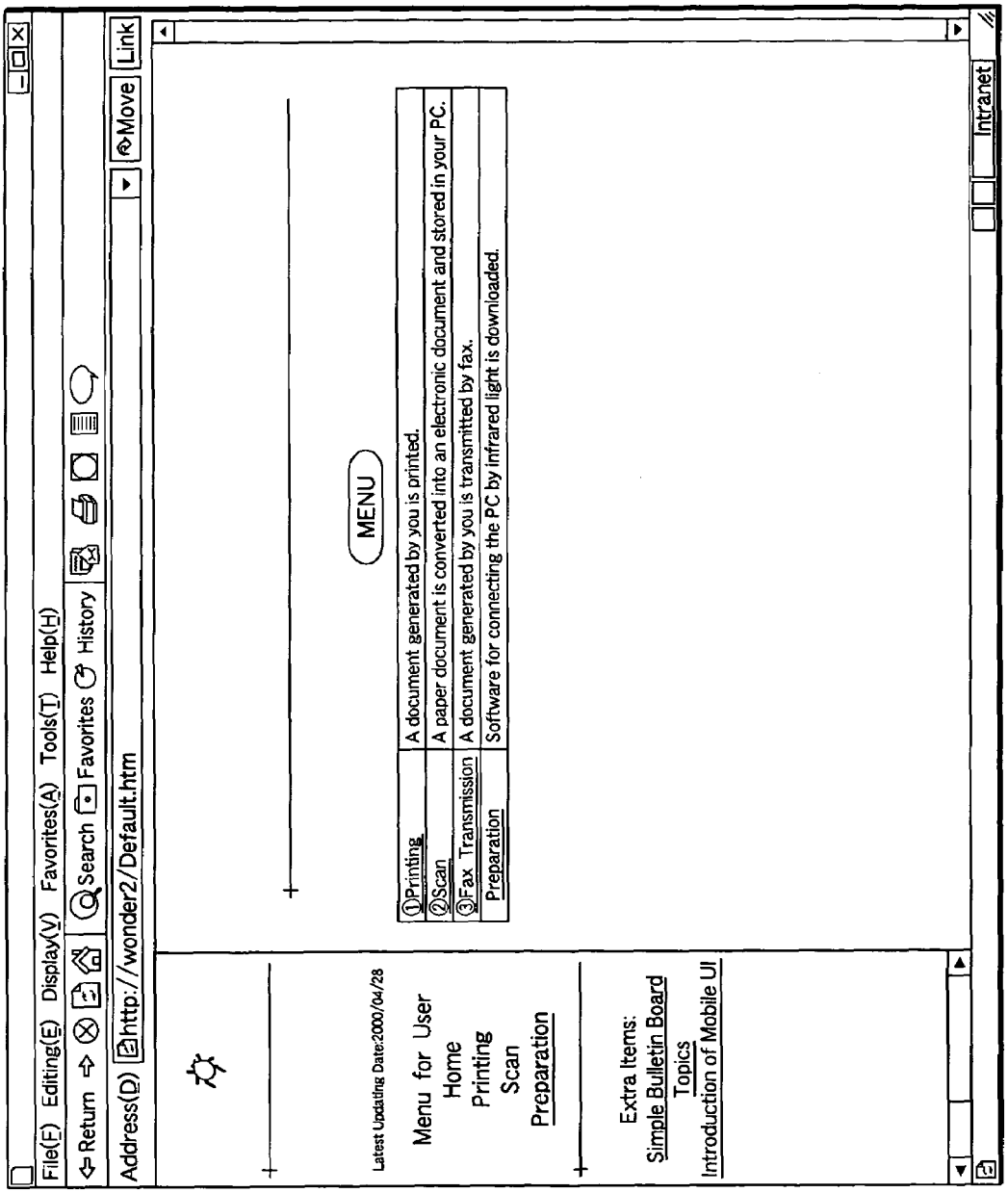
FIG. 5 shows a main picture of the user interface section 33 of the information terminal apparatus 3.

FIG. 5 shows a main picture of the user interface section 33 of the information terminal apparatus 3. If it is confirmed that the user is a person who is permitted to use the image input/output system 1 based on the user name and the password that were key-input on the log-in picture (FIG. 4), the main picture shown in FIG. 5 is supplied from the user interface providing section 45 of the image input/output control apparatus 4 to the user interface section 33 of the information terminal apparatus 3 and is displayed there. On the main picture, the user selects one of selection items of "Printing," "Scan," and "Fax transmission" by clicking the mouse on it. To print text data or image data stored in the information terminal apparatus 3 using the image input/output apparatus 2, the user selects "Printing." To read an image with the image input/output apparatus 2 and store resulting image data in the information terminal apparatus 3, the user selects "Scan." To fax-transmit, with the image input/output apparatus 2, text data or image data stored in the information terminal apparatus 3, the user selects "Fax transmission."

Figure 6:
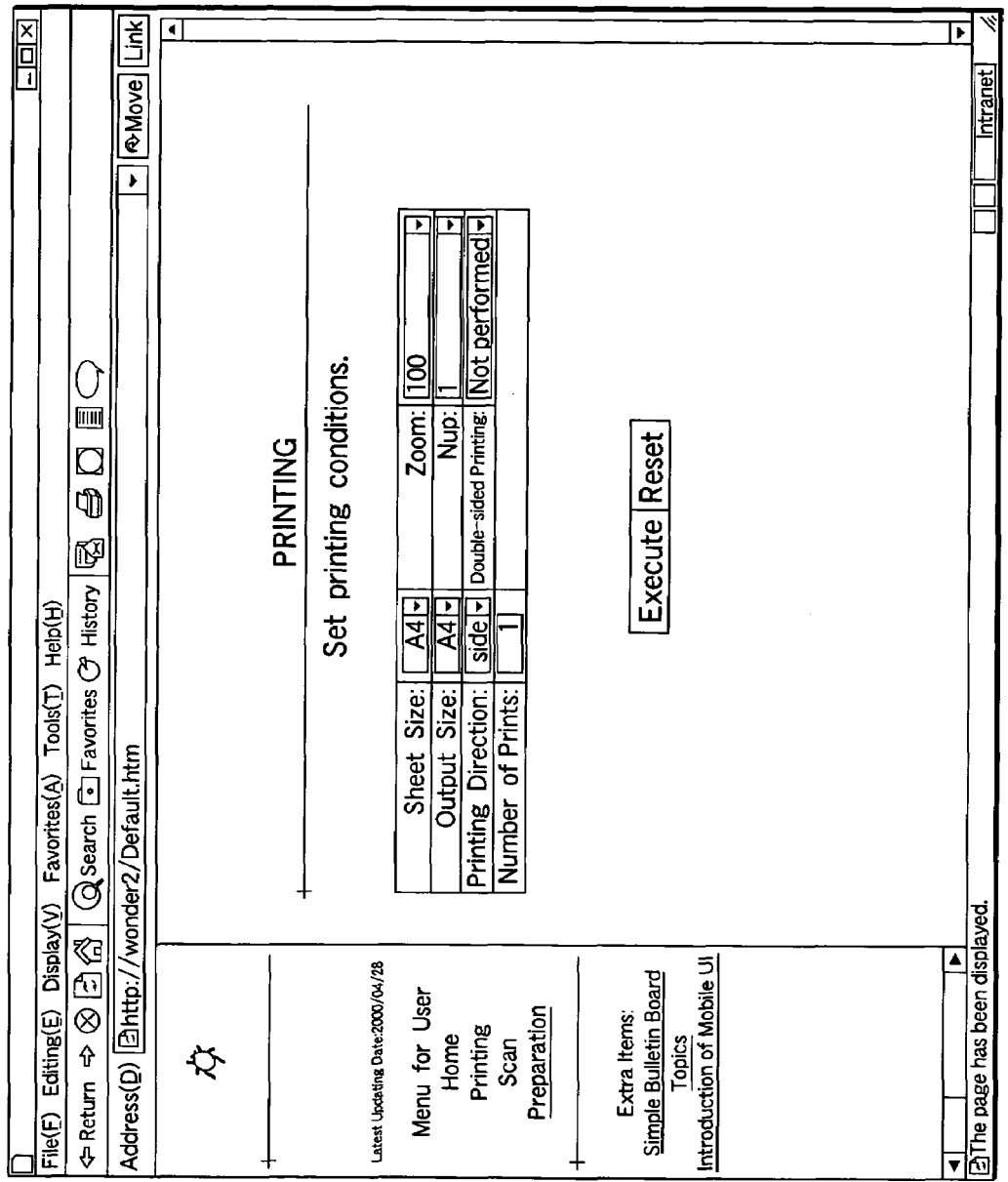
FIG. 6 shows a printing condition setting picture of the user interface section 33 of the information terminal apparatus 3.

FIG. 6 shows a printing condition setting picture of the user interface section 33 of the information terminal apparatus 3. If "Printing" is selected on the main picture (FIG. 5), the printing condition setting picture shown in FIG. 6 is supplied from the user interface providing section 45 of the image input/output control apparatus 4 to the user interface section 33 of the information terminal apparatus 3 and is displayed there. On the printing condition setting picture, the user sets "Sheet Size" that is an output sheet size, "Output Size" that is an output image size, "Printing Direction" indicating whether the direction of printing sheets is vertical or horizontal, "Number of Prints" that is the number of output prints, "Zoom" that is an output magnification factor, "Nup" that is the number of pages of images to be output to one side of respective sheets, and "Double-sided Printing" indicating whether to perform double-sided printing. After completion of the setting of the above printing conditions, the user selects "Execute" by clicking the mouse on it.

Figure 7:
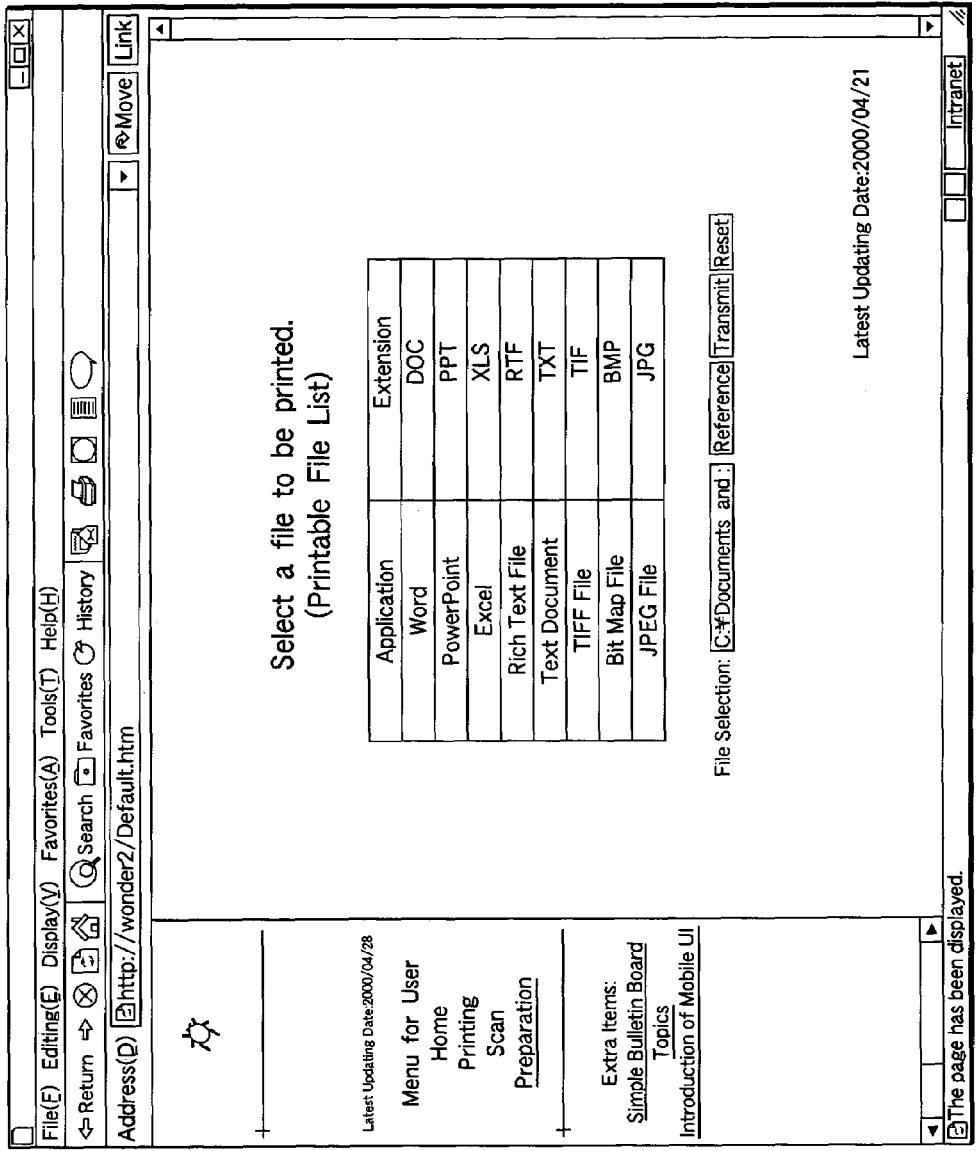
FIG. 7 shows a printing file selection picture of the user interface section 33 of the information terminal apparatus 3.

FIG. 7 shows a printing file selection picture of the user interface section 33 of the information terminal apparatus 3. If "Execute" is selected on the printing condition setting picture (FIG. 6), the printing file selection picture shown in FIG. 7 is supplied from the user interface providing section 45 of the image input/output control apparatus 4 to the user interface section 33 of the information terminal apparatus 3 and is displayed there. Printable file types (application software types and file extensions) are listed in a table located at the center of the printing file selection picture. "Word," "PowerPoint," and "Excel" shown in an "Application" column of this table are registered trademarks. The user selects a file to be printed from the files stored in the storage section 32 of the information terminal apparatus 3 by using a "File Selection" space of the printing file selection picture. After completion of the selection of a printing file, the user selects "Transmit" by clicking the mouse on it.

Figure 8:
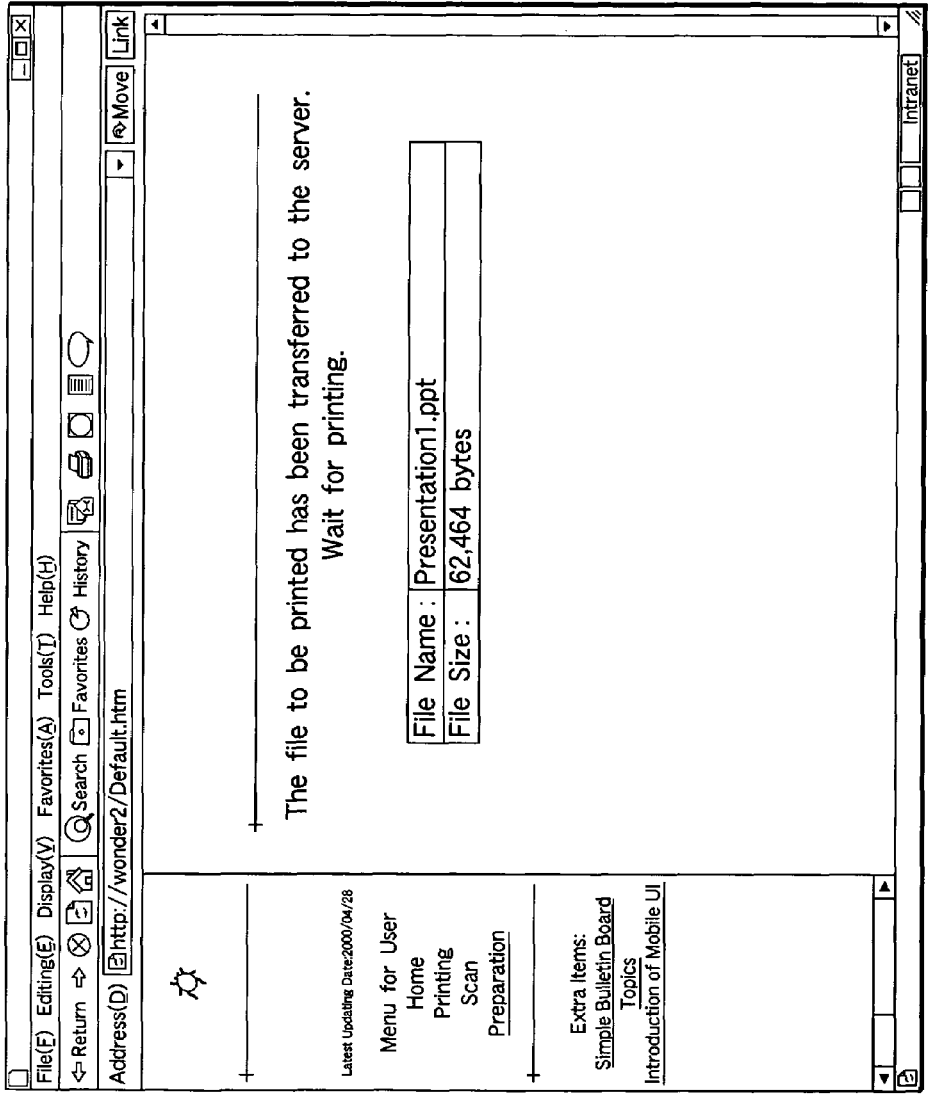
FIG. 8 shows a printing file transfer message display picture of the user interface section 33 of the information terminal apparatus 3.

FIG. 8 shows a printing file transfer message display picture of the user interface section 33 of the information terminal apparatus 3. If a printing file and "Transmit" are selected on the printing file selection picture (FIG. 7), the printing file transfer message display picture shown in FIG. 8 is supplied from the user interface providing section 45 of the image input/output control apparatus 4 to the user interface section 33 of the information terminal apparatus 3 and is displayed there. A message to the effect that data of the printing conditions and the printing file that were set or selected by the user have been transferred from the information terminal apparatus 3 to the image input/output control apparatus 4 as well as a name "Presentation 1.ppt" of the printing file selected by the user and its file size "62,464 bytes" is displayed on the printing file transfer message display picture.

While the printing file transfer message display picture (FIG. 8) is displayed, the image input/output system 1 operates in the following manner. Control data including the printing conditions that were set on the printing condition setting picture (FIG. 6) and data of the printing file selected on the printing file selection picture (FIG. 7) are transmitted to the control section 48 via the transmitting/receiving section 31 of the information terminal apparatus 3, the IrDA transceiver 6, and the second transmitting/receiving section 42 of the image input/output control apparatus 4 and are stored in the storage section 43.

Figure 9:
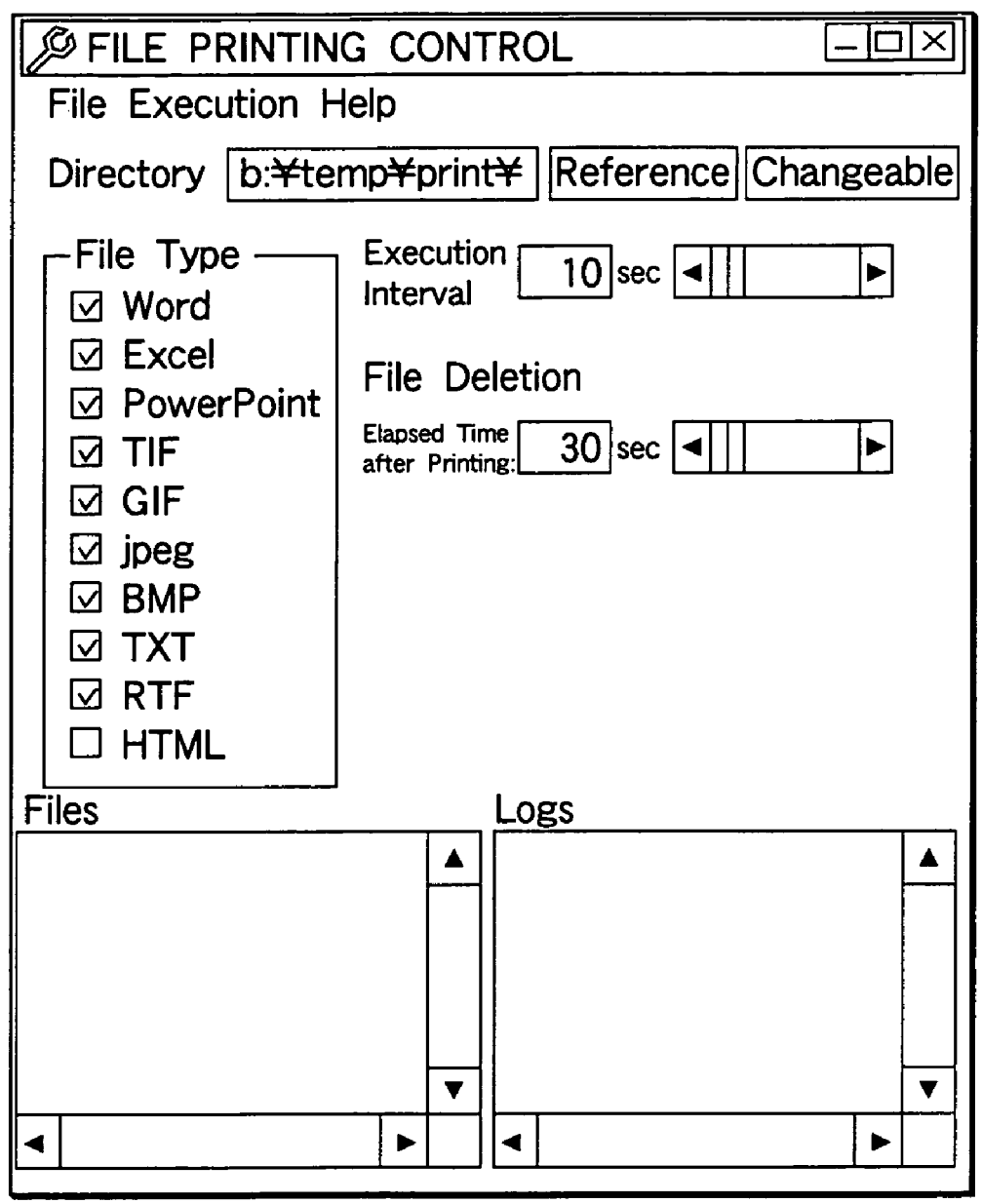
FIG. 9 shows a printing execution picture of a user interface section 46 of an image input/output control apparatus 4.

FIG. 9 shows a printing execution picture of the user interface section 46 of the image input/output control apparatus 4. When the control data and the data of the printing file are transferred from the storage section 32 of the information terminal apparatus 3 to the storage section 43 of the image input/output control apparatus 4, the printing execution picture shown in FIG. 9 is supplied from the user interface providing section 45 of the image input/output control apparatus 4 to the user interface section 46 and is displayed there. On the printing execution picture, the user confirms that the printing file that should have been transferred is stored in the storage section 43 of the image input/output control apparatus 4. Start of printing is commanded upon selection of the printing file.

After commanding of the start of printing, the first-format data of the printing file stored in the storage section 43 is converted into second-format data that can be handled by the image printing section 22 of the image input/output apparatus 2 by the data conversion section 44, and stored again in the storage section 43. The second-format data and the control data stored in the storage section 43 are transmitted to the transmitting/receiving section 24 of the image input/output apparatus 2 via the control section 48 and the first transmitting/receiving section 41 and are stored in the storage section 25. Under the control of the control section 26, an image is printed by the image printing section 22 based on the second-format data stored in the storage section 25 according to the printing conditions indicated by the control data that is stored in the storage section 25.

After completion of the image printing by the image input/output apparatus 2, the printing file stored in the storage section 43 of the image input/output control apparatus 4 for which printing has completed is deleted according to the user's instruction or is deleted automatically after a lapse of a prescribed time (30 seconds in the case of the picture shown in FIG. 9) after the printing. The billing section 47 of the image input/output control apparatus 4 calculates an amount of money to be charged based on the printing conditions etc. indicated by the control data, and the calculated amount of money is communicated to the billing apparatus 5. Based on this notice, the billing apparatus 5 charges the user who has performed the image printing using the information terminal apparatus 3. The operation relating to the image printing is finished here.

Figure 10:
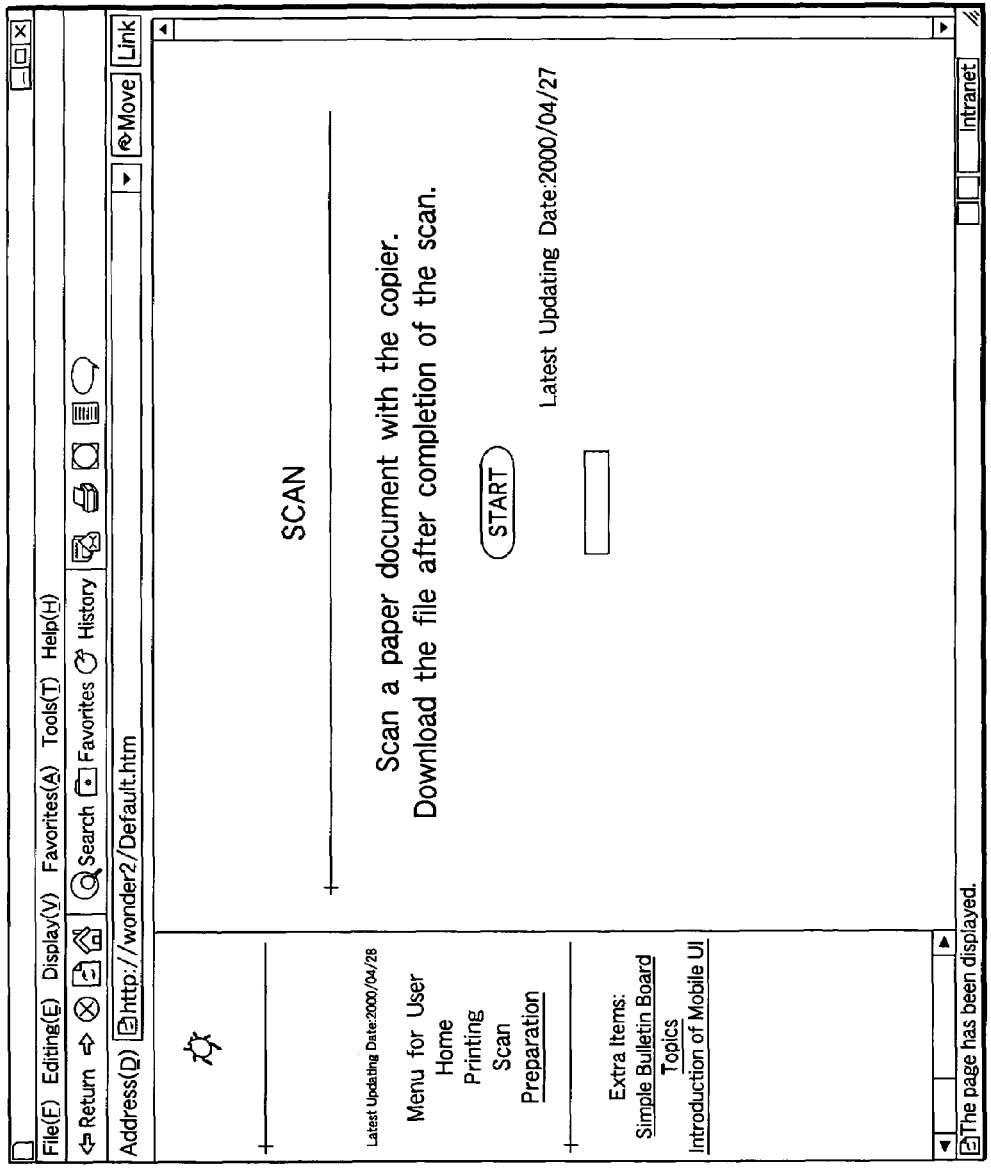
FIG. 10 shows a scan start instruction picture of the user interface section 33 of the information terminal apparatus 3.

FIG. 10 shows a scan start instruction picture of the user interface section 33 of the information terminal apparatus 3. If "Scan" is selected on the main picture (FIG. 5), the scan start instruction picture shown in FIG. 10 is supplied from the user interface providing section 45 of the image input/output control apparatus 4 to the user interface section 33 of the information terminal apparatus 3 and is displayed there. The scan start instruction picture is to urge the user to cause reading (scan) of an image on a document. If "START" on the scan start instruction picture is clicked with the mouse, an image on the document that is placed at a prescribed position in the image reading section 21 of the image input/output apparatus 2 is read. Resulting image data is stored temporarily in the storage section 25, transmitted from the transmitting/receiving section 24 to the control section 48 of the image input/output control apparatus 4 via the first transmitting/receiving section 41, and a scan file of the image data is stored in the storage section 43.

Figure 11:
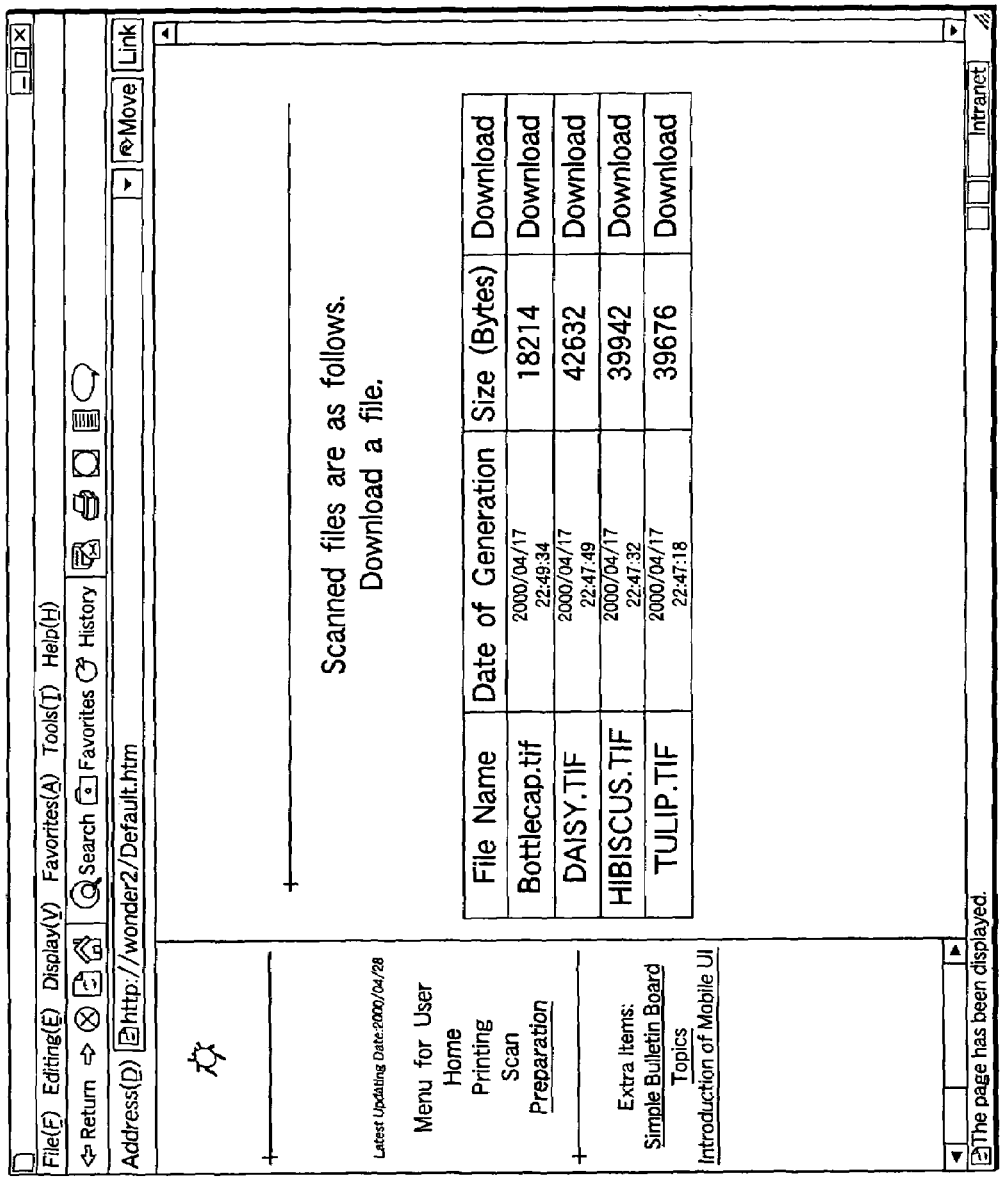
FIG. 11 shows a scan file display picture of the user interface section 33 of the information terminal apparatus 3.

FIG. 11 shows a scan file display picture of the user interface section 33 of the information terminal apparatus 3. If the scan file is stored in the storage section 43 of the image input/output control apparatus 4 after "START" was clicked with the mouse on the scan start instruction picture (FIG. 10), the scan file display picture shown in FIG. 11 is supplied from the user interface providing section 45 of the image input/output control apparatus 4 to the user interface section 33 of the information terminal apparatus 3 and is displayed there. The scan file display picture is to display a file name, a date of generation, and a size (the number of bytes) of each scan file stored in the storage section 43 of the image input/output control apparatus 4 as well as to allow selection of a scan file to be downloaded to the information terminal apparatus 3 by clicking the mouse on the associated one of the words "Download" in the "Download" column.

Figure 12:
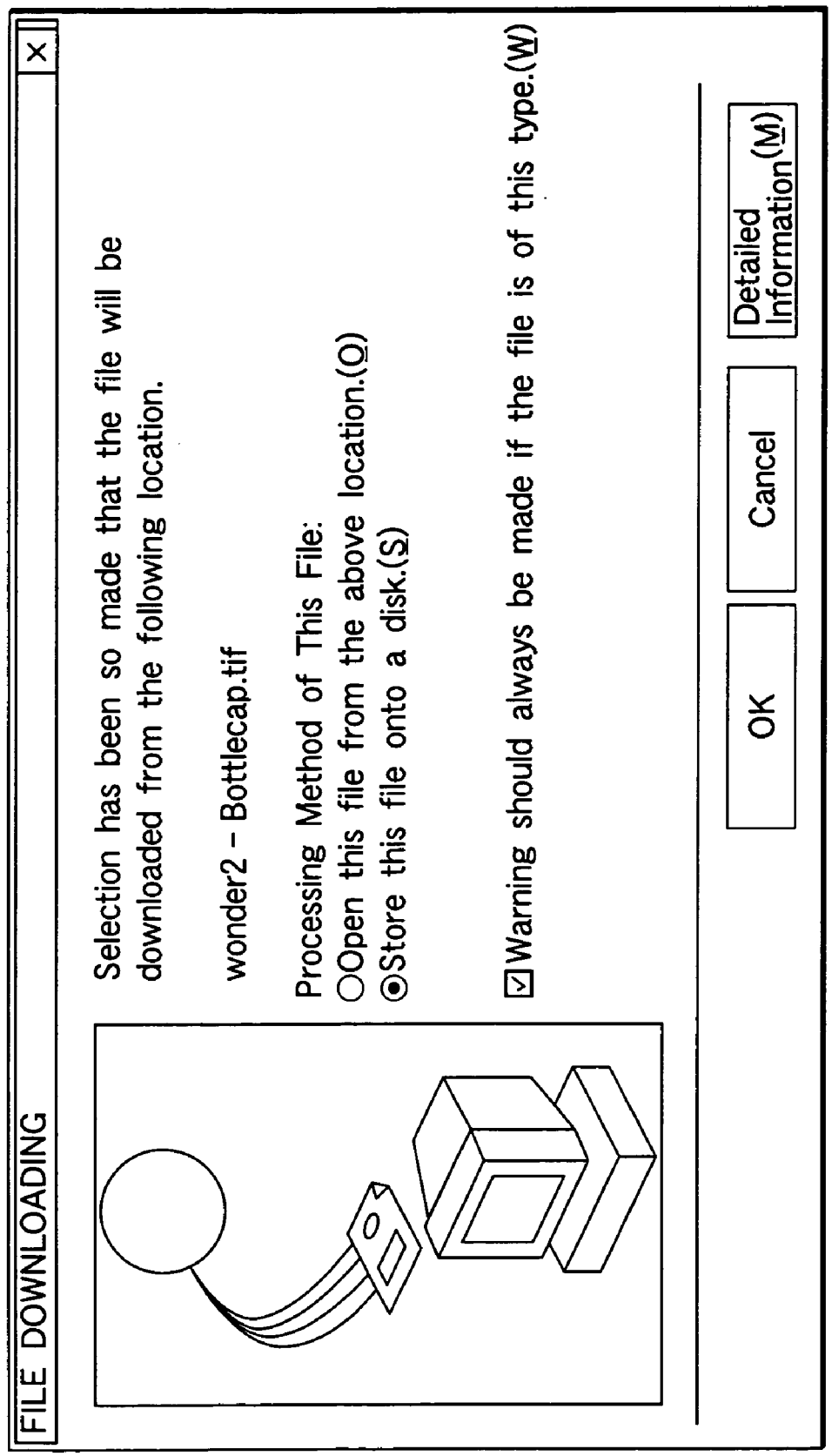
FIG. 12 shows a download confirmation picture of the user interface section 33 of the information terminal apparatus 3.

FIG. 12 shows a download confirmation picture of the user interface section 33 of the information terminal apparatus 3. If downloading of one scan file is selected on the scan file display picture (FIG. 11), the download confirmation picture shown in FIG. 12 is supplied from the user interface providing section 45 of the image input/output control apparatus 4 to the user interface section 33 of the information terminal apparatus 3 and is displayed there. The download confirmation picture displays a file name "Bottlecap.tif" of the selected scan file. The download confirmation picture is to urge the user to select a processing method, that is, previewing the scan file by opening it or storing the scan file in the storage section 32. After a scan file processing method is selected, "OK" is clicked with the mouse.

Figure 13:
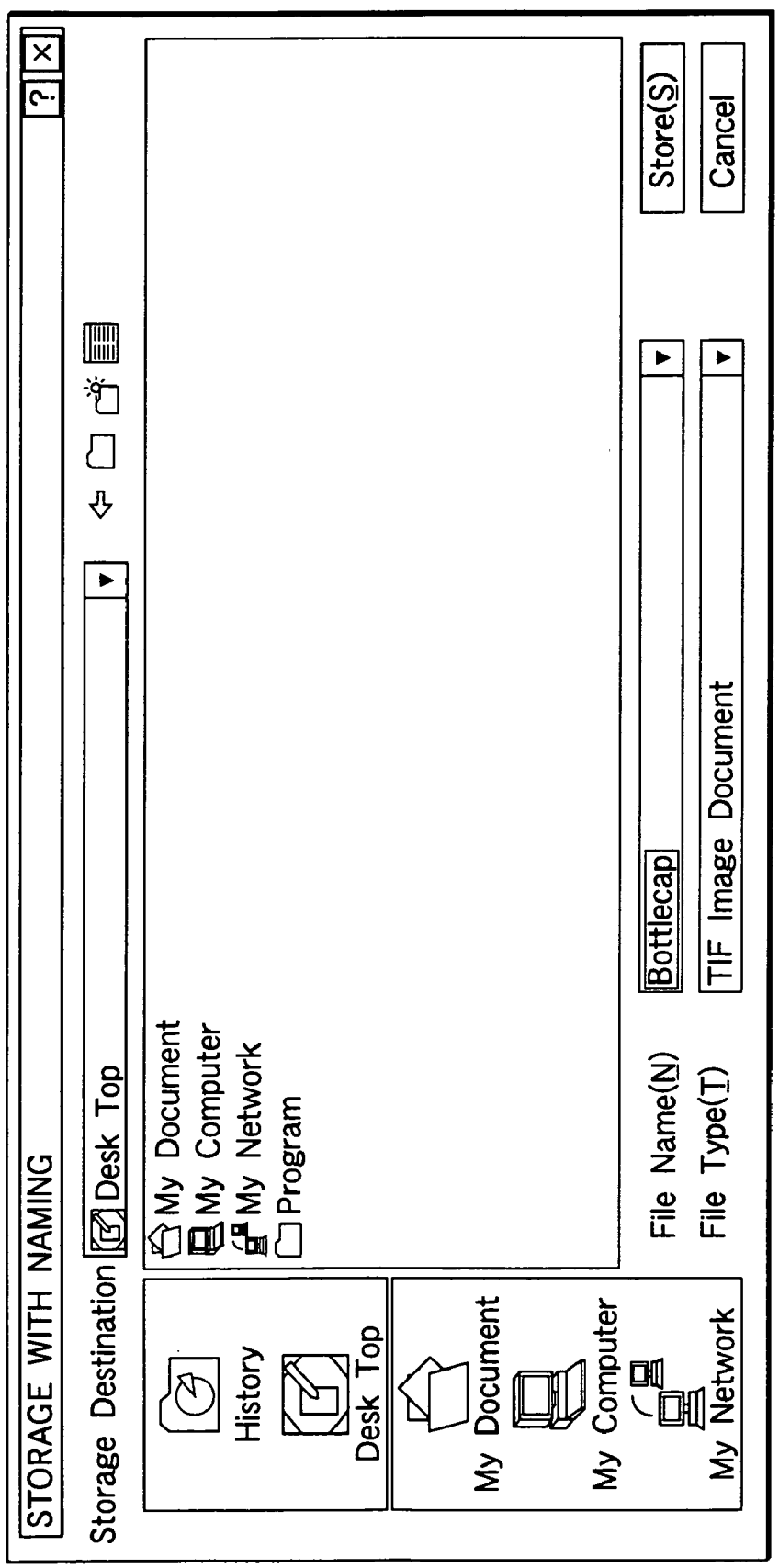
FIG. 13 shows a storage destination selection picture of the user interface section 33 of the information terminal apparatus 3.

FIG. 13 shows a storage destination selection picture of the user interface section 33 of the information terminal apparatus 3. If "OK" is clicked with the mouse after storage of the scan file in the storage section 32 is selected on the down load confirmation picture (FIG. 12), the storage destination selection picture shown in FIG. 13 is supplied from the user interface providing section 45 of the image input/output control apparatus 4 to the user interface section 33 of the information terminal apparatus 3 and is displayed there. On the storage destination selection picture, the name of a folder, for example, in which to store the scan file is selected and "Store" is clicked with the mouse.

Figure 14:
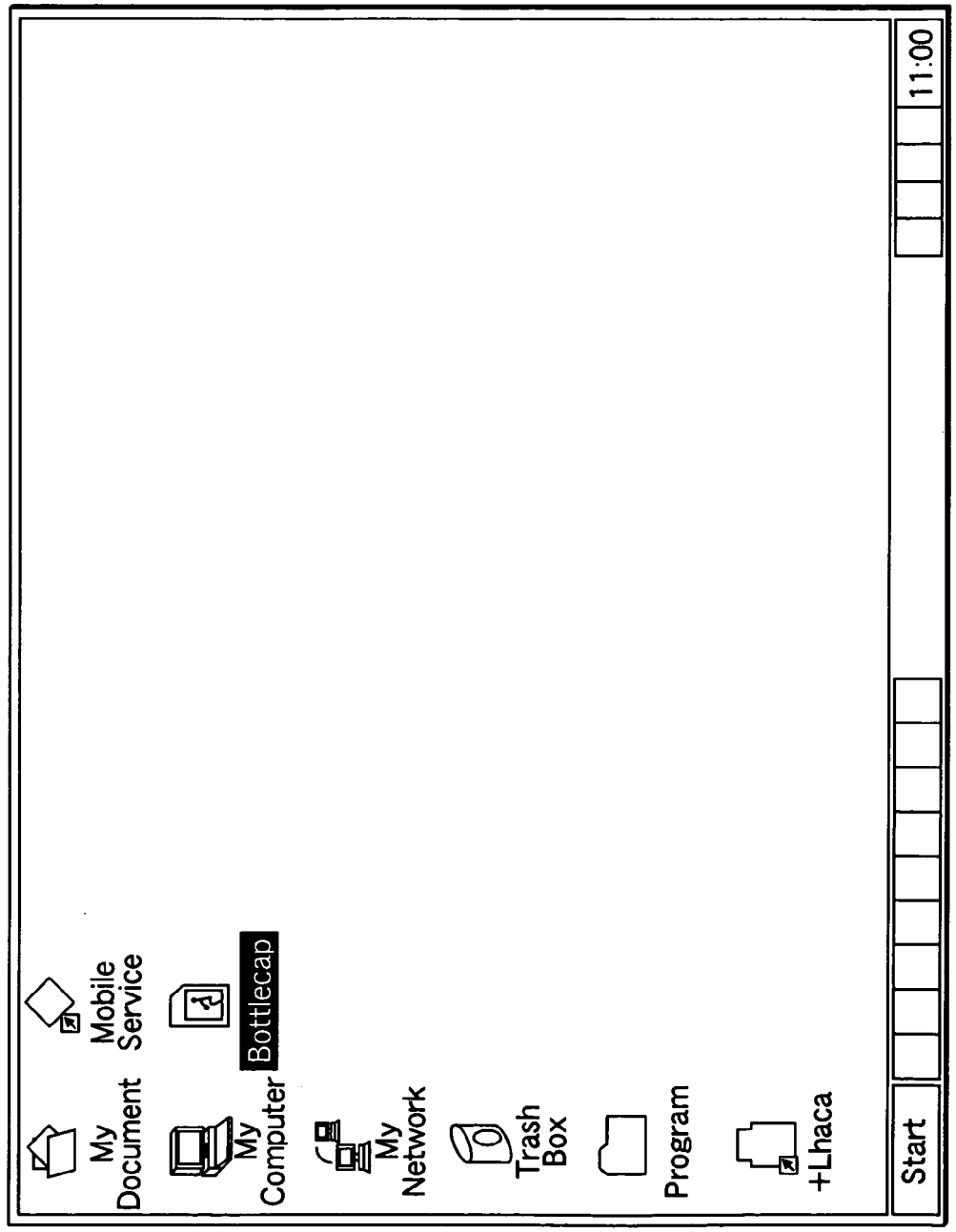
FIG. 14 shows a picture that appears in the user interface section 33 of the information terminal apparatus 3 after completion of a scan operation.

FIG. 14 shows a picture that appears in the user interface section 33 of the information terminal apparatus 3 after completion of the scan operation. If the desk top is selected as a storage destination of the scan file on the storage destination selection picture (FIG. 13), the scan file "Bottlecap.tif" stored in the storage section 43 of the image input/output control apparatus 4 is transmitted to the transmitting/receiving section 31 of the information terminal apparatus 3 via the control section 48, the second transmitting/receiving section 42, and the IrDA transceiver 6 and is stored in the desk top that is the selected storage destination of the storage section 32. As shown in FIG. 14, the icon of the scan file "Bottlecap.tif" is displayed on the desk top picture.

Figure 15:
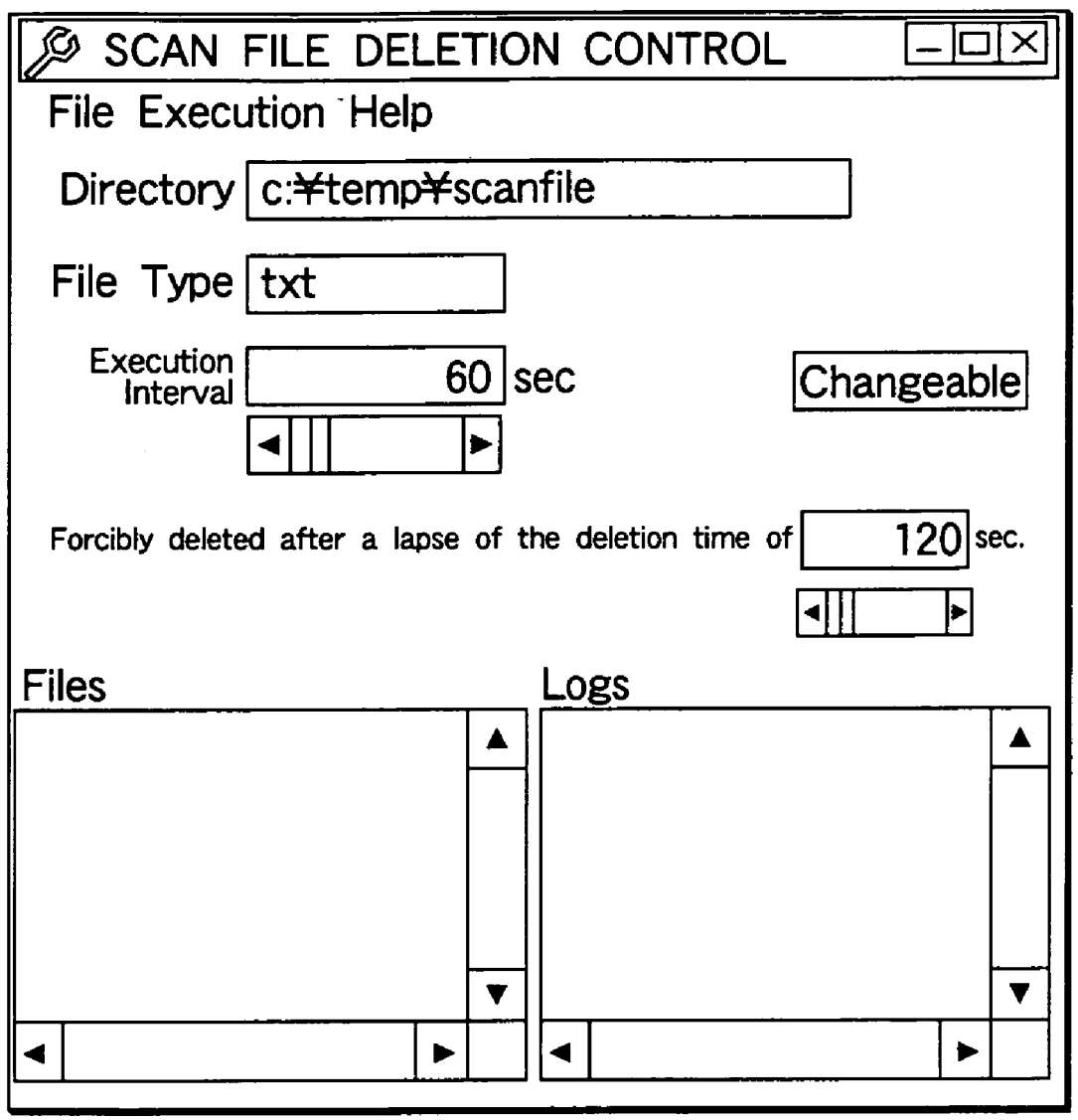
FIG. 15 shows a scan file display picture of the user interface section 46 of the image input/output control apparatus 4.

FIG. 15 shows a scan file display picture of the user interface section 46 of the image input/output control apparatus 4. The scan file display picture displays a list of scan files that is stored in the storage section 43 of the image input/output control apparatus 4. A scan file that was produced by scanning (image reading) by the image reading section 21 of the image input/output apparatus 2 and then stored in the storage section 43 of the image input/output control apparatus 4 is deleted after being downloaded to the information terminal apparatus 3 or is deleted automatically after a lapse of a prescribed time (120 seconds in the case of the picture shown in FIG. 15) after the scan. The billing section 47 of the image input/output control apparatus 4 calculates an amount of money to be charged, and the calculated amount of money is communicated to the billing apparatus 5. Based on this notice, the billing apparatus 5 charges the user who has performed the image input/output using the information terminal apparatus 3. The operation relating to the image reading is finished here.

The operation of fax transmission is approximately the same as the operation of image printing. However, in the case of fax transmission, a file to be transmitted by fax is selected from the files stored in the storage section 32 of the information terminal apparatus 3 and a fax transmission destination (a name or a telephone number) is key-input or selected. A picture that appears in this case is such that spaces for key input and selection of a fax transmission destination, respectively, are added to the picture shown in FIG. 7. This picture is also supplied from the user interface providing section 45 of the image input/output control apparatus 4 to the user interface section 33 of the information terminal apparatus 3 and is displayed there.

It is preferable that each user interface that is supplied from the user interface providing section 45 of the image input/output control apparatus 4 to the user interface section 33 of the information terminal apparatus 3 also have a viewer function and a preview function. The viewer function is to display, for confirmation by the user, an image that has been read by the image reading section 21, an image to be printed by the image printing section 22, or an image to be fax-transmitted by the fax transmitting section 23. The preview function is to also display, for confirmation by the user, an image to be read by the image reading section 21, an image to be printed by the image printing section 22, or an image to be fax-transmitted by the fax transmitting section 23. However, the preview function deals with a smaller amount of data and hence requires a shorter time to display or process (e.g., change the display direction of or enlarge/reduce) an image than the viewer function does. The preview function allows a user to confirm the direction of a document at the time of image reading or a relative positional relationship between a sheet and an image at the time of image printing.

Next, a description will be made of an example of how a user uses the image input/output system 1 according to the embodiment. The image input/output apparatus 2, which is stationary in general, is installed at places where many users can use it, such as offices, convenience stores, libraries, public halls, service stations, hotels, and apartment houses. The information terminal apparatus 3 is relatively light in general and hence can be carried by a user. An example of how a user uses the image input/output system 1 will be described below under the above conditions.

When a user who carries the information terminal apparatus 3 wants to perform image input or output, he goes to a place where the image input/output apparatus 2 and the image input/output control apparatus 4 are installed. The user applies power to each of the image input/output apparatus 2, the information terminal apparatus 3, and the image input/output control apparatus 4. Then, the user establishes a state that the second transmitting/receiving section 42 of the image input/output control apparatus 4 and the transmitting/receiving section 31 of the information terminal apparatus 3 can communicate with each other and causes the user interface section 33 of the information terminal apparatus 3 to display the initial display picture (FIG. 3). The user double-clicks the mouse on the icon having the words "Mobile Service" on the initial display picture (FIG. 3) and thereby causes the user interface section 33 of the information terminal apparatus 3 to display the log-in picture (FIG. 4). The user key-inputs a user name and a password and clicks the mouse on "Log-in" on the log-in picture (FIG. 4) and thereby causes the user interface section 33 of the information terminal apparatus 3 to display the main picture (FIG. 5). Further, the user clicks the mouse on one of "Printing," "Scan," and "Fax transmission" on the main picture (FIG. 5).

If the user wants to perform image printing, he selects "Printing" on the main picture (FIG. 5) and thereby causes the user interface section 33 of the information terminal apparatus 3 to display the printing condition setting picture (FIG. 6). On the printing condition setting picture (FIG. 6), the user sets operation conditions of image printing and clicks the mouse on "Execute." Then, on the printing file selection picture (FIG. 7) being displayed by the user interface section 33 of the information terminal apparatus 3, the user selects a file to be printed from the files stored in the storage section 32 of the information terminal apparatus 3 and clicks the mouse on "Transmit."

Upon the mouse clicking of "Transmit," the printing file transfer message display picture (FIG. 8) is displayed by the user interface section 33 of the information terminal apparatus 3. When a printing file is transferred from the storage section 32 of the information terminal apparatus 3 to the storage section 43 of the image input/output control apparatus 4, the user checks, on the printing execution picture (FIG. 9) being displayed by the user interface section 46 of the image input/output control apparatus 4, whether the printing file that should have been transferred is stored in the storage section 43 of the image input/output control apparatus 4, selects the printing file, and commands start of printing.

The user should input cash to or insert a prepaid card or the like into the billing apparatus 5 before commanding start of printing. After completion of the image printing, the user receives image-printed sheets from the image input/output apparatus 2. The user receives the change if any or picks up the prepaid card or the like from the billing apparatus 5. The above are all the manipulations to be made for the image printing.

If the user wants to perform image reading, he selects "Scan" on the main picture (FIG. 5) and thereby causes the user interface section 33 of the information terminal apparatus 3 to display the scan start instruction picture (FIG. 10). The user sets a document on which an image to be read is drawn at a prescribed position in the image reading section 21 of the image input/output apparatus 2. Then, the user clicks the mouse on "START" on the scan start instruction picture (FIG. 10). As a result, the image is read and a resulting image data file is stored in the storage section 43 of the image input/output control apparatus 4. On the scan file display picture (FIG. 11) being displayed by the user interface section 33 of the information terminal apparatus 3, the user selects a scan file to be downloaded to the information terminal apparatus 3 from the scan files stored in the storage section 43 of the image input/output control apparatus 4.

Then, on the download confirmation picture (FIG. 12) being displayed by the user interface section 33 of the information terminal apparatus 3, the user confirms the file name of the scan file that was selected as a file to be downloaded, selects storage of the scan file in the storage section 32, and clicks the mouse on "OK." Then, on the storage destination selection picture (FIG. 13) being displayed by the user interface section 33 of the information terminal apparatus 3, the user selects the name of a folder where the scan file should be stored and clicks the mouse on "Store." As a result, the scan file of the data of the read image is stored in the selected destination of the storage section 32 of the information terminal apparatus 3.

Then, on the picture (FIG. 14) that is displayed by the user interface section 33 of the information terminal apparatus 3 after completion of the scan operation, the user confirms that the scan file has been stored in the storage section 32 of the information terminal apparatus 3. Further, on the scan file display picture (FIG. 15) being displayed by the user interface section 46 of the image input/output control apparatus 4, the user confirms that the scan file has been deleted from the storage section 43 of the image input/output control apparatus 4.

The user should input cash to or insert a prepaid card or the like into the billing apparatus 5 before the downloading of the scan file to the information terminal apparatus 3. After completion of the image reading, the user picks up the document from the image input/output apparatus 2. The user receives the change if any or picks up the prepaid card or the like from the billing apparatus 5. The above are all the manipulations to be made for the image reading.

If the user wants to perform fax transmission, he selects "Fax transmission" on the main picture (FIG. 5). Thereafter, the user performs manipulations that are approximately the same as in the case of image printing. Specifically, on a fax transmission condition setting picture being displayed by the user interface section 33 of the information terminal apparatus 3, the user sets operation conditions of fax transmission and then clicks the mouse on "Execute." Then, on a transmission file selection picture being displayed by the user interface section 33 of the information terminal apparatus 3, the user selects a file to be transmitted from the files stored in the storage section 32 of the information terminal apparatus 3, specifies a transmission destination, and clicks the mouse on "Transmit."

Upon the mouse clicking of "Transmit," a transmission file transfer message display picture is displayed by the user interface section 33 of the information terminal apparatus 3. When the transmission file is transferred from the storage section 32 of the information terminal apparatus 3 to the storage section 43 of the image input/output control apparatus 4, on a transmission execution picture being displayed by the user interface section 46 of the image input/output control apparatus 4, the user checks whether the transmission file that should have been transferred is stored in the storage section 43 of the image input/output control apparatus 4, selects the transmission file, and commands its fax transmission.

The user should input cash to or insert a prepaid card or the like into the billing apparatus 5 before the fax transmission instruction is made. After completion of the fax transmission, the user receives the change if any or picks up the prepaid card or the like from the billing apparatus 5. The above are all the manipulations to be made for the fax transmission.

As described above, in the image input/output system 1 according to the embodiment, the image input/output control apparatus 4 is interposed between the image input/output apparatus 2 and the information terminal apparatus 3. Data exchange is performed between the first transmitting/receiving section 41 of the image input/output control apparatus 4 and the transmitting/receiving section 24 of the image input/output apparatus 2 as well as between the second transmitting/receiving section 42 of the image input/output control apparatus 4 and the transmitting/receiving section 31 of the information terminal apparatus 3. The first transmitting/receiving section 41 and the second transmitting/receiving section 42 are isolated from each other physically. Under the control of the control section 48 of the image input/output control apparatus 4, data received by one of the first transmitting/receiving section 41 and the second transmitting/receiving section 42 is transmitted by the other.

Therefore, even if the image input/output apparatus 2 and the image input/output control apparatus 4 are connected to each other via a network such as a LAN, the information terminal apparatus 3 and the image input/output control apparatus 4 can be connected to each other via a network that is independent of the above network and addresses specific to the independent network can be set in a fixed manner. Therefore, the user of the information terminal apparatus 3 who wants to perform image input or output using the image input/output apparatus 2 need not understand the LAN environment including the image input/output apparatus 2 and the image input/output control apparatus 4 in connecting the information terminal apparatus 3 to the image input/output control apparatus 4 nor set addresses of the respective apparatuses by himself. Enabling connection work that is so easy to a user, the image input/output system 1 of the embodiment is highly convenient. Since the information terminal apparatus 3 and the image input/output control apparatus 4 are connected to each other via a dedicated network, no illegal access to other apparatuses on the LAN is possible; the image input/output system 1 of the embodiment is superior in security.

User interfaces relating to image input/output of the image input/output apparatus 2 are supplied from the user interface providing section 45 of the image input/output control apparatus 4. This allows a user to perform image input or output in an environment of unified user interfaces, which is another example of convenience provided by the image input/output system 1 of the embodiment.

In the embodiment, the billing apparatus 5 charges, in accordance with image input or output processing of the image input/output apparatus 2, a user who has performed image input or output using the information terminal apparatus 3. This makes it possible to install the image input/output apparatus 2 and the image input/output control apparatus 4 at places where they can be used by indefinite users. Even if only a particular user group can use those apparatuses, this enables charging of each user.

The invention is not limited to the above embodiment and various modifications are possible. For example, it is preferable that the image input/output control apparatus 4 perform a virus check on data to be exchanged between the information terminal apparatus 3 and the image input/output apparatus 2. This further improves the security.

It is preferable that in image printing the information terminal apparatus 3 transmit data of a printing file to the image input/output control apparatus 4 after coding it and the image input/output apparatus 2 start printing after the image input/output control apparatus 4 decodes the data of the printing file. It is also preferable that the information terminal apparatus 3 transmit a password or the like to the image input/output control apparatus 4 together with data of a printing file and the image input/output apparatus 2 start printing when the image input/output control apparatus 4 inputs the password. This allows a user to reliably obtain sheets on which printing has been performed by himself.

As described above in detail, in the invention, the image input/output control apparatus is interposed between the image input/output apparatus and the information terminal apparatus. Data exchange is performed between the first transmitting/receiving section of the image input/output control apparatus and the image input/output apparatus as well as between the second transmitting/receiving section of the image input/output control apparatus and the information terminal apparatus. The first transmitting/receiving section and the second transmitting/receiving section are isolated from each other physically. Under the control of the control section of the image input/output control apparatus, data received by one of the first transmitting/receiving section and the second transmitting/receiving section is transmitted by the other.

Therefore, even if the image input/output apparatus and the image input/output control apparatus are connected to each other via a network such as a LAN, the information terminal apparatus and the image input/output control apparatus can be connected to each other via a network that is independent of the above network and addresses specific to the independent network can be set in a fixed manner. Therefore, the user of the information terminal apparatus who wants to perform image input or output using the image input/output apparatus need not understand the LAN environment including the image input/output apparatus and the image input/output control apparatus in connecting the information terminal apparatus to the image input/output control apparatus nor set addresses of the respective apparatuses by himself. Enabling connection work that is so easy to a user, the image input/output system of the invention is highly convenient. Since the information terminal apparatus and the image input/output control apparatus are connected to each other via a dedicated network, no illegal access to other apparatuses on the LAN is possible; the image input/output system of the invention is superior in security.

It is preferable that the image input/output control apparatus of the invention further have the user interface providing section for providing user interfaces relating to image input/output of the image input/output apparatus. This allows a user to perform image input or output in an environment of the unified user interfaces that are provided by the user interface providing section, which is another example of convenience provided by the image input/output system of the invention.

It is also preferable that the image input/output system of the invention further have the billing apparatus for charging, in accordance with image input or output processing of the image input/output apparatus, a user who has performed image input or output using the information terminal apparatus. This makes it possible to install the image input/output apparatus and the image input/output control apparatus at places where they can be used by indefinite users. Even if only a particular user group can use those apparatuses, this enables charging of each user.

The entire disclosure of Japanese Patent Application No. 2000-177096 filed on Jun. 13, 2000 including specification, claims, drawings and abstract is incorporated herein by reference in its entirety.

What is claimed is:

1. An image input and output control apparatus comprising:
   a first transmitting and receiving section that transmits and receives data to and from an image input and output apparatus that performs image input and output;
   a second transmitting and receiving section that transmits and receives at least two of print data, scan data, and fax data to and from an information terminal apparatus that stores data to be handled by the image input and output apparatus in performing image input or output;
   a control section that causes data received by one of the first transmitting and receiving section and the second transmitting and receiving section to be transmitted from the other;
   a storage section that stores the data received by one of the first transmitting and receiving section and the second transmitting and receiving section;
   a user interface providing section that provides user interfaces to a user interface section; and
   a data conversion section that converts first format data stored in the storage section into second format data, and stores the converted data in the storage section.

2. The image input and output control apparatus according to claim 1, wherein the second transmitting and receiving section transmits and receives the data wirelessly to and from a mobile information terminal apparatus.

3. The image input and output control apparatus according to claim 1, further comprising a user interface providing section that provides a user interface relating to the image input and output of the image input and output apparatus.

4. An image input and output system comprising:
   an image input and output apparatus that performs image input and output;
   an information terminal apparatus that stores data to be handled by the image input and output apparatus in performing image input or output; and
   the image input and output control apparatus according to claim 1 that transmits and receives data to and from each of the image input and output apparatus and the information terminal apparatus.

5. The image input/output control apparatus according to claim 4, further comprising a billing apparatus that charges, in accordance with image input or output processing of the image input and output apparatus, a user who has performed image input or output using the information terminal apparatus.

6. The image input/output control apparatus according to claim 1; wherein the control section causes, in causing the data received by one of the first transmitting and receiving section and the second transmitting and receiving section to be transmitted from the other, the data to be converted into a data format suitable for a transmission destination apparatus.

7. An image input and output control apparatus that receives printing data from an information terminal apparatus and transmits the printing data to an image input and output apparatus that prints out the printing data comprising:
   a Web server that provides the information terminal apparatus with a user interface for setting a printing condition and instructing execution of printing though a Web browser;

a controller that controls transmission of the received printing data including the printing condition set by the information terminal apparatus to the image input and output apparatus;

a receiver that receives the printing data wirelessly from the information terminal apparatus;

a transmitter that transmits the printing data to the image input and output apparatus; and a data conversion section that converts first format data stored in the storage section into second format data, and stores the converted data in the storage section;

wherein the printing conditions include at least one of resolution, density and color.

8. The image input and output control apparatus according to claim 7, further comprising a memory that stores the received printing data.

9. The image input and output control apparatus according to claim 8, wherein the controller deletes the stored data according to a user instruction after the printing has completed.

10. The image input and output control apparatus according to claim 8, wherein the controller deletes the stored data after a lapse of a prescribed time after the printing has completed.

11. The image input and output control apparatus according to claim 7, wherein the receiver and the transmitter are isolated from each other physically.

12. The image input and output control apparatus according to claim 7, wherein the receiver receives the printing data over a network from the information terminal apparatus.

13. The image input and output control apparatus according to claim 7, wherein the transmitter transmits the printing data over a network to the image input and output apparatus.

14. The image input and output control apparatus according to claim 7, further comprising a billing controller that calculates an amount of money to be charged based on the printing condition.

15. An image input and output control apparatus that receives first-format data from an information terminal apparatus and transmits second-format data to an image input and output apparatus that prints out the second-format data comprising:

a Web server that provides the information terminal apparatus with a user interface for setting a printing condition and instructing execution of printing through a Web browser;

a data converter that converts the received first-format data stored in a storage section including the printing condition set by the information terminal apparatus into the second-format data which can be handled by the image input and output apparatus and stores the converted data in the storage section;

a controller that controls transmission of the second-format data to the image input and output apparatus;

a receiver that receives the first-format data wirelessly from the information terminal apparatus; and a transmitter that transmits the second-format data to the image input and output apparatus, wherein the printing conditions include at least one of resolution, density and color.

16. The image input and output control apparatus according to claim 15, further comprising a memory that stores the received first-format data.

17. The image input and output control apparatus according to claim 16, wherein the controller deletes the stored first-format data according to a user instruction after the printing has completed.

18. The image input and output control apparatus according to claim 15, further comprising a memory that stores the converted second-format data.

19. The image input and output control apparatus according to claim 18, wherein the controller deletes the stored second-format data after a lapse of prescribed time after the printing has completed.

20. The image input and output control apparatus according to claim 15, wherein the receiver and the transmitter are isolated from each other physically.

21. The image input and output control apparatus according to claim 15, wherein the receiver receives the first-format data over a network from the information terminal apparatus.

22. The image input and output control apparatus according to claim 15, wherein the transmitter transmits the second-format data over a network to the image input and output apparatus.

23. The image input and output control apparatus according to claim 15, further comprising a billing controller that calculates an amount of money to be charged based on the printing condition.

* * * * *